INVENTOR.
Pierre G. Foret
BY
Hovey, Schmidt, Johnson & Hovey
ATTORNEYS.

Sept. 14, 1965 P. G. FORET 3,206,090

CAPSTAN CONTROL APPARATUS

Filed June 10, 1963 2 Sheets-Sheet 2

INVENTOR.
Pierre G. Foret
BY
Hovey, Schmidt, Johnson & Hovey
ATTORNEYS

3,206,090
CAPSTAN CONTROL APPARATUS

Pierre G. Foret, Tulsa, Okla., assignor to Midwestern Instruments, Inc., Tulsa, Okla., a corporation of Oklahoma Filed June 10, 1963, Ser. No. 286,763
5 Claims. (Cl. 226—51)

This invention relates to drive apparatus for tape transports.

The digital tape transport art has progressed rapidly in recent years with the introduction of transports capable of moving magnetic tape through a read or write head at high speeds without subjecting the tape to injurious stresses. Nearly instant reversibility, as well as high speed in each direction, has been achieved through the use of apparatus which employs positive and/or negative air pressures to effectively hold the tape on the drive capstans and prevent fouling of the tape.

Although such apparatus is highly successful, it is also complex and expensive relative to many applications wherein tape transports are utilized. Many of these applications actually do not require the very high drive and oscillation speeds that the transport is capable of and, therefore, do not exploit the features of the transport to nearly the fullest extent.

It is, therefore, the primary object of this invention to provide a tape transport of relatively low cost for use in applications such as aforesaid wherein only moderate driving speeds and cyclic rates are required.

It is another object of this invention to provide a tape transport drive mechanism that is relatively uncomplex and highly reliable.

It is another object of this invention to provide drive apparatus for a tape transport having a single tape-receiving capstan, the apparatus including a rotatable member operably coupled with the capstan, a pair of rotatable devices for selectively engaging the member to rotate it and the capstan in clockwise or counterclockwise directions, structure presenting a stationary surface converging toward the member, and a roller for simultaneous engagement with the member and the surface for braking the member.

It is still another object of this invention to provide capstan drive means as in the last mentioned object wherein a prime mover is provided for continuously driving a pair of rotatable elements in opposed directions, the aforesaid rotatable devices each being movable upon command by control circuitry into simultaneous engagement with the member and a corresponding element.

Other objects will become apparent as the detailed description proceeds.

Figure 4:
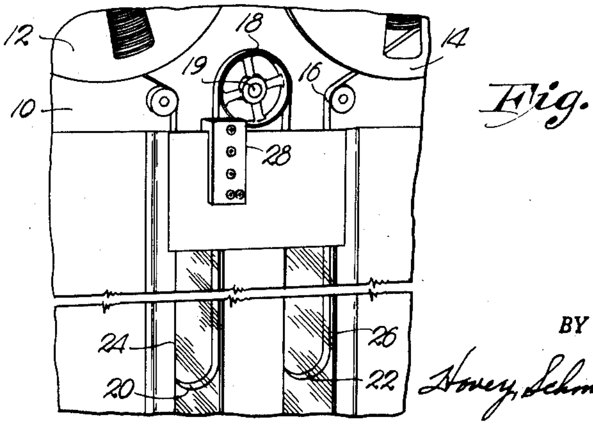
FIG. 4 is a perspective view of a portion of the front panel of a tape transport showing the storage and take-up spools, the capstan, the read-write head, and the pressure chambers employed to maintain the tape in secure engagement with the capstan.

Referring first to FIG. 4, the front panel 10 of a tape transport is shown with tape reels 12 and 14 mounted thereon. Reel 12 is shown as the storage reel and reel 14 as the take-up reel for magnetic tape 16, but it will be understood that this is illustrative only since the drive mechanism to be hereinafter described is capable of driving tape 16 in either direction.

Tape 16 is engaged by a single, rotatable capstan 18 mounted on a shaft 19 which extends outwardly through panel 10. Tape loops 20 and 22 are formed on each side of capstan 18 and depend into a pair of pressure chambers 24 and 26, respectively. As is common in the art, chambers 24 and 26 are communicated with pneumatic apparatus for reducing the air pressure within the chambers. In this manner a negative air pressure exists below loops 20 and 22 which, in turn, forces tape 16 into firm engagement with the peripheral surface of capstan 18.

A read-write head is disposed on the panel 10 and receives tape 16. The input and output (not shown) of head 28 is coupled with the recording and transcribing circuitry of the tape transport, such circuitry forming no part of the instant invention.

Figures 1, 5:
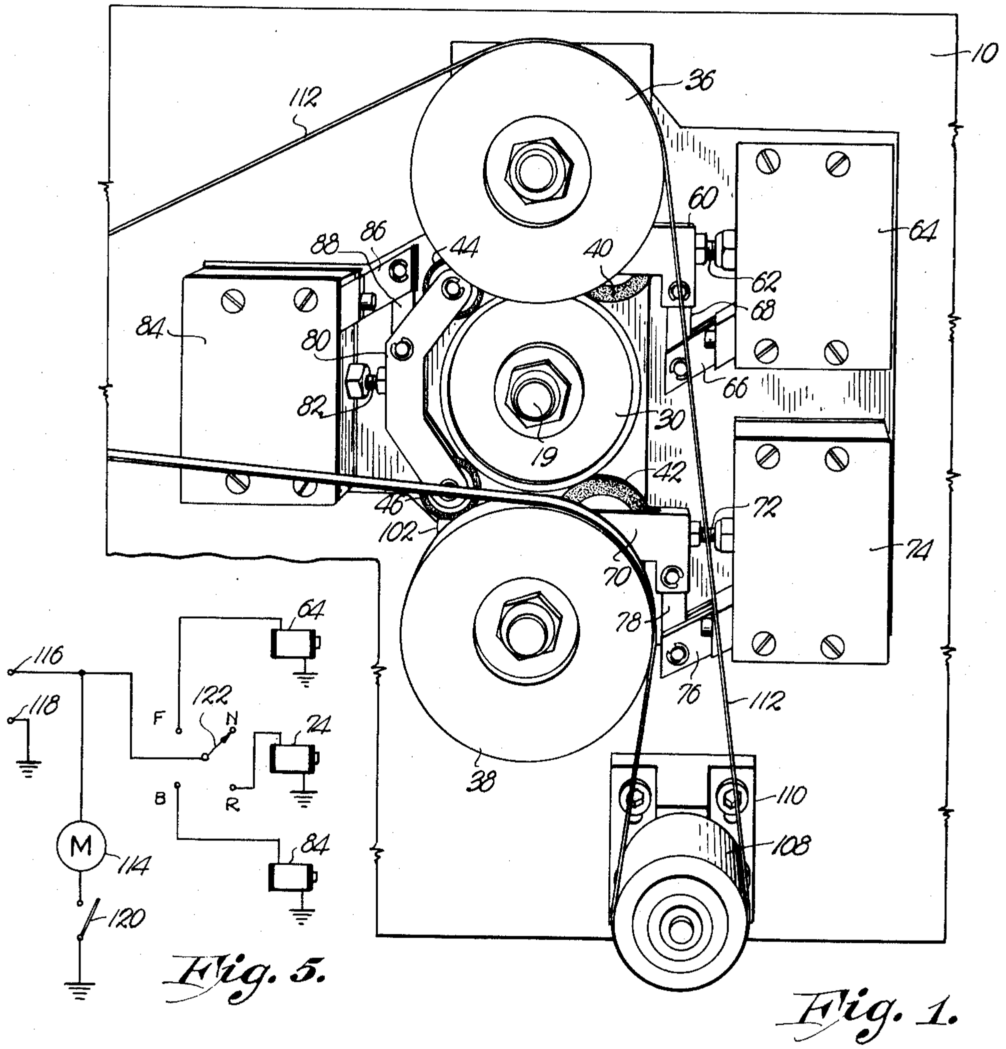
FIG. 1 is a perspective view of the drive apparatus.
FIG. 5 is an electrical schematic diagram of a simplified control circuit for the drive apparatus.
Figure 3:
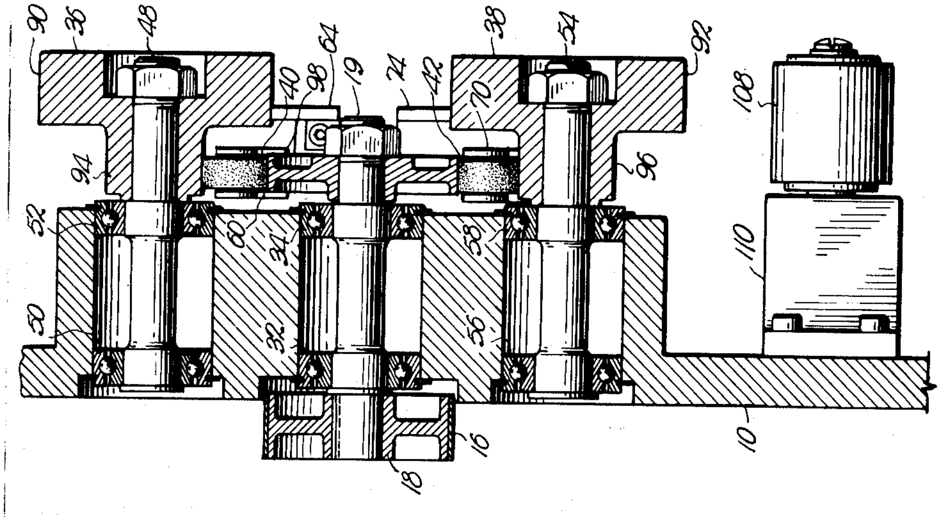
FIG. 3 is a sectional view taken along line 3—3 of FIG. 2 with the mounting shafts of the various rotatable devices shown in elevation for clarity.
Figure 2:
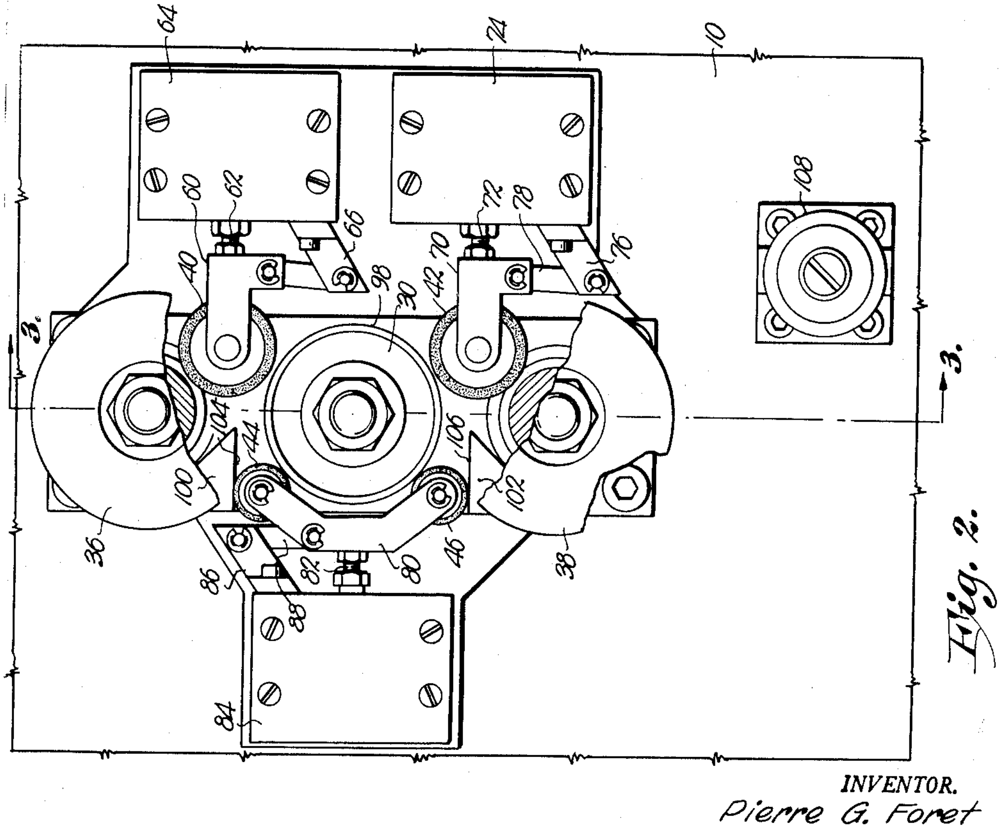
FIG. 2 is a fragmentary, vertical, elevational view of the drive apparatus with parts broken away for clarity.

Referring to FIGS. 1–3, a rotatable member 30 is shown rigid with the end of shaft 19 remote from capstan 18. Member 30 and the structure associated therewith to be hereinafter described are disposed on the rearward side of panel 10 in the interior of the tape transport. It may be seen in FIG. 3 that panel 10 serves as a support for this structure and for capstan 18.

Spaced bearings 32 and 34 journal shaft 19 on panel 10. The other rotatable structures associated with member 30 include a pair of rotatable elements 36 and 38, a pair of rotatable devices 40 and 42, and a pair of rollers 44 and 46. Element 36 is rigidly secured to a shaft 48 which is journaled on panel 10 by spaced bearings 50 and 52. In like fashion, element 38 is rigidly secured to shaft 54 journaled on panel 10 by bearings 56 and 58.

Device 40 is mounted between bifurcations of a bifurcated arm 60. Arm 60 is rigid with an output shaft 62 of an electromechanical actuator 64. Actuator 64 may comprise any one of a variety of electrically responsive devices capable of axially advancing shaft 62. For example, actuator 64 could be a solenoid provided with an armature which is coupled with shaft 62. Support member 66 is rigid with the housing of actuator 64 and has a support link 68 pivotally attached to the end of member 66 and to arm 60. In like manner, device 42 is rotatably mounted on bifurcated arm 70 rigid with output shaft 72 of an electromechanical actuator 74. A support member 76 and a support link 78 are coupled with the housing of actuator 74 and with arm 70, respectively, in identical fashion as for arm 60 and actuator 64.

A bracket 80 is provided with a pair of bifurcated ends which receive rollers 44 and 46 for rotatably mounting the rollers on the bracket. Bracket 80 is rigid with output shaft of an electromechanical actuator 84. In the same manner as described for actuators 64 and 74, a support member 86 and a support link 88 couples the housing of actuator 84 with bracket 80.

Elements 36 and 38 have circular, peripheral edges 90 and 92, respectively, and reduced, circular peripheries 94 and 96, respectively. Member 30 has a peripheral, circular surface zone 98. Device 40 engages zone 98 and periphery 94 upon shifting of the device by actuator 64 for purposes to be hereinafter described. Also, it may be seen that device 42, upon shifting by actuator 74, engages zone 98 and periphery 96 of element 38.

A pair of wedges 100 and 102 are rigidly secured to panel 10 and present stationary, planar surfaces 104 and 106, respectively, which converge toward zone 98 of member 30. Surface 104 lies in a plane parallel with a tangent to circular surface zone 98 through the uppermost point on zone 98 as viewed in FIG. 2. Surface 106 lies in a plane parallel to a tangent through the lowermost point on zone 98 as viewed in FIG. 2. The output shaft 82 of actuator 84 is shown in the actuated position with roller 44 engaging surface 104 and zone 98, and roller 46 engaging surface 106 and zone 98.

An idler pulley 108 is spaced from panel 10 by support 110 and receives a belt 112 which frictionally engages peripheral edge 90 of element 36 and edge 92 of element 38. Belt 112 serves to apply rotative driving force to elements 36 and 38, it being noted that the elements will revolve in opposite directions when belt 112 is set in motion.

Referring to FIG. 5, a prime mover 114 in the form of an electric motor is shown coupled with connection points 116 and 118 through a switch 120. Connection points 116 and 118 are adapted to be coupled with a source of electrical energy which, upon closure of switch 120, energizes motor 114. The shaft of motor 114 is operably coupled with belt 112 to thereby provide means for imparting rotative motion to elements 36 and 38.

A rotary switch having a movable pole 122 and four contacts labeled "F," "N," "R" and "B" is shown in FIG. 5 for selectively applying electrical energy to actuators 64, 74 and 84. The switch positions correspond, respectively, to forward tape drive, neutral, reverse tape drive, and "brake" or rapid stopping of the tape drive mechanism. It should be understood that the control circuitry of FIG. 5 is a simplified circuit arrangement shown for the primary purpose of illustrating the selective operability of actuators 64, 74 and 84. In actual practice, high speed electronic switching circuitry may be employed depending on the needs of the particular application.

As mentioned previously, in the operation of the tape transport, the tape 16 is received by capstan 18 and held thereon due to the negative air pressure below loops 20 and 22. With the movable pole 122 of the rotary switch in the neutral position as shown, the operation of the drive apparatus is initiated by closing switch 120 to energize motor 114 and drive elements 36 and 38. Tape 16, however, will not be advanced while the rotary switch is in the neutral position since neither actuator 64 nor actuator 74 will be coupled with the power source.

Referring to FIG. 2, the output shaft 62 of actuator 64 and the output shaft 72 of actuator 74 are shown with the actuators de-energized as is the case when the rotary switch is in the neutral position. It may be noted that device 40 is not engaged with element 36 or member 30, and that device 42 is not engaged with element 38 or member 30. Thus, in the neutral position no rotational energy is transferred from either of the elements 36 and 38 to member 30.

Movement of pole 122 into engagement with the "F" or the "R" contacts causes the tape to be driven in the forward or the reverse direction accordingly. For example, movement of the rotary switch into the forward drive position energizes actuator 64 and advances its output shaft 62 leftwardly as viewed in FIG. 2, to place device 40 in frictional engagement with periphery 94 of element 36 and zone 98 of member 30. The contacting surface of device 40 may be composed of a substance having a high coefficient of friction. Thus, it is evident that rotative energy from the continually moving element 36 will be transferred to member 30 and capstan 18.

During actuation of output shaft 62 it may be noted that link 68 pivots at its juncture with arm 60 and member 66. The tolerances of the pivotal joints are such that shaft 62 is permitted to move axially along a rectilinear path of travel. Member 66 and link 68 serve only as support structure for relieving the stresses placed upon arm 60 and shaft 62 when device 40 is advanced into engagement with member 30 and element 36.

Reversal of the tape drive is achieved by moving pole 122 into engagement with the "R" contact, at which time actuator 74 is energized to advance output shaft 72 to, in turn, place device 42 in frictional engagement with periphery 96 of element 38 and zone 98 of member 30. This action is analogous to that as described above for actuator 64 and device 40.

Capstan 18 is stopped by advancing pole 122 to the brake position corresponding to contact "B" which causes enegization of actuator 84. Actuator 84 is shown in the energized position in the figures to illustrate the action of the brake. It may be seen that output shaft 82 is advanced rightwardly when actuator 84 is energized to place roller 44 in frictional engagement with surface 104 and zone 98, and to place roller 46 in frictional engagement with surface 106 and zone 98. This wedging action of the rollers due to the convergence of surfaces 104 and 106 toward zone 98 effectively halts member 30 and capstan 18 nearly instantaneously at most drive speeds.

Since elements 36 and 38 are of the same dimensions, their rotate at equal speeds (but in opposite directions) and, in turn, cause the capstan 18 to be driven at the same speed in either direction. It may be appreciated that a variable speed motor is commonly employed for prime mover 114 to thereby provide multiple tape speeds.

The disposition of the contacts engageable by movable pole 122 indicates that the direction of the tape drive may be reversed without energizing actuator 84 and applying the brake. Therefore, at most tape speeds, drive reversal may be accomplished by a single step.

Having thus described the invention, what is claimed as new and desired to be secured by Letters Patent is:

1. In tape transport drive apparatus:
- a prime mover;
- a pair of spaced-apart, rotatable elements;
- means operably coupling the prime mover with said elements for driving the elements in opposite directions of rotation;
- a tape-receiving, rotatable capstan;
- a rotatable member operably coupled with the capstan and spaced from said elements;
- a pair of rotatable devices, one of said devices being disposed for movement into engagement with one of said elements and said member for driving the member in one direction of rotation, the other device being positioned for movement into engagement with the other element and said member for driving the member in the opposite direction of rotation;
- actuator means coupled with each of said devices for shifting each device toward and away from the member and the corresponding element;
- structure positioned adjacent said member and presenting a stationary surface converging toward the member;
- a roller disposed for movement into simultaneous frictional engagement with said surface and said member; and
- power means coupled with said roller for shifting the roller into and out of engagement with the surface and the member, whereby to brake the member to thereby stop the rotation of the capstan after one of the devices has imparted rotative momentum to the member and subsequently been disengaged therefrom.

2. In apparatus as set forth in claim 1, wherein said means coupling the prime mover with the elements continuously drives said elements during operation of the prime mover.

3. In apparatus as set forth in claim 1, wherein said member has a substantially circular surface zone thereon concentric with its axis of rotation, said devices and said roller being for frictional engagement with said zone.

4. In apparatus as set forth in claim 3, wherein said stationary surface is planar and converges toward said zone.

5. In apparatus as set forth in claim 1, wherein is provided control means operably coupled with said power means and each of said actuator means for controlling operation thereof to permit operative engagement with the member of only one of said rollers and devices at a time.

References Cited by the Examiner

UNITED STATES PATENTS

| | | | |
|---|---|---|---|
| 2,704,138 | 3/55 | Gibson et al. | 188—80 |
| 2,753,026 | 7/56 | Dietz | 192—4 |
| 3,038,678 | 6/62 | Papst | 226—51 X |
| 3,070,321 | 12/62 | Bara | 226—50 X |
| 3,100,071 | 8/63 | Neff | 226—176 |

ROBERT B. REEVES, *Acting Primary Examiner.*

RAPHAEL M. LUPO, SAMUEL F. COLEMAN, *Examiners.*